Aug. 19, 1952 B. NOBLE 2,607,579
MIX SELECTOR CONTROL
Filed June 28, 1949 5 Sheets-Sheet 1

INVENTOR.
BERT NOBLE
BY
*A. Dunham Olwer*
ATTORNEY

Aug. 19, 1952  B. NOBLE  2,607,579
MIX SELECTOR CONTROL
Filed June 28, 1949  5 Sheets-Sheet 2

INVENTOR.
BERT NOBLE
BY
ATTORNEY

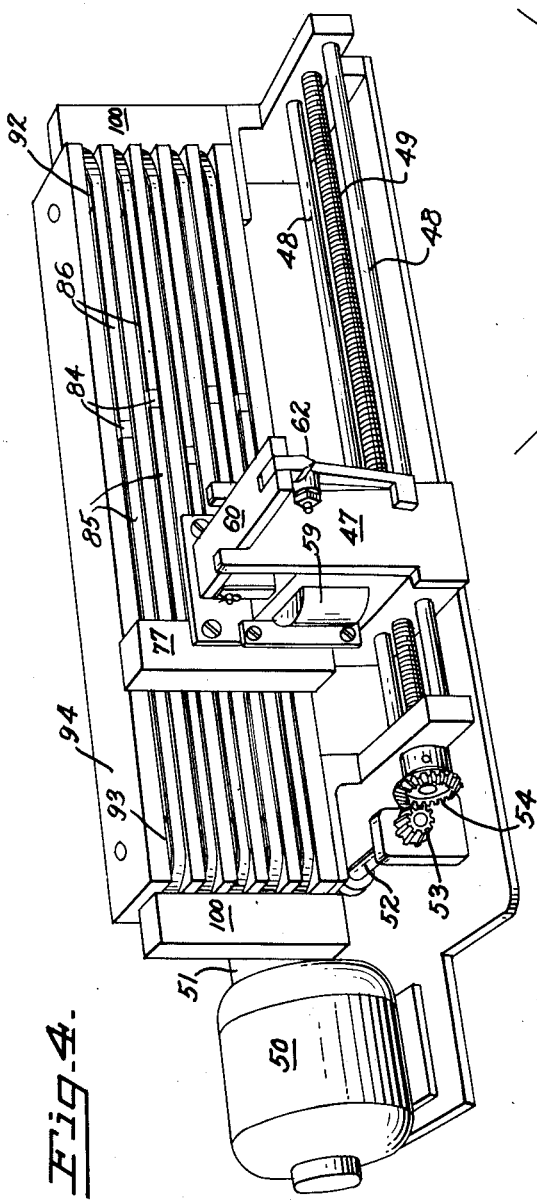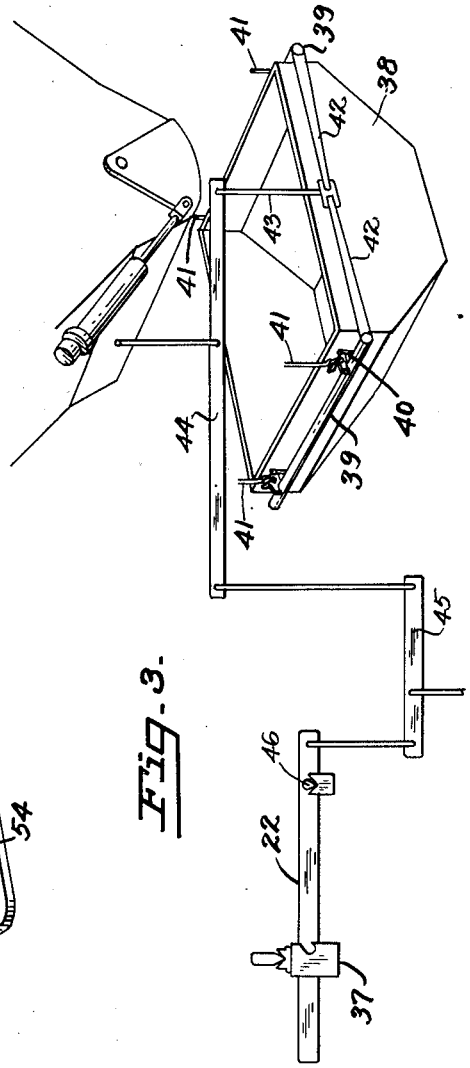

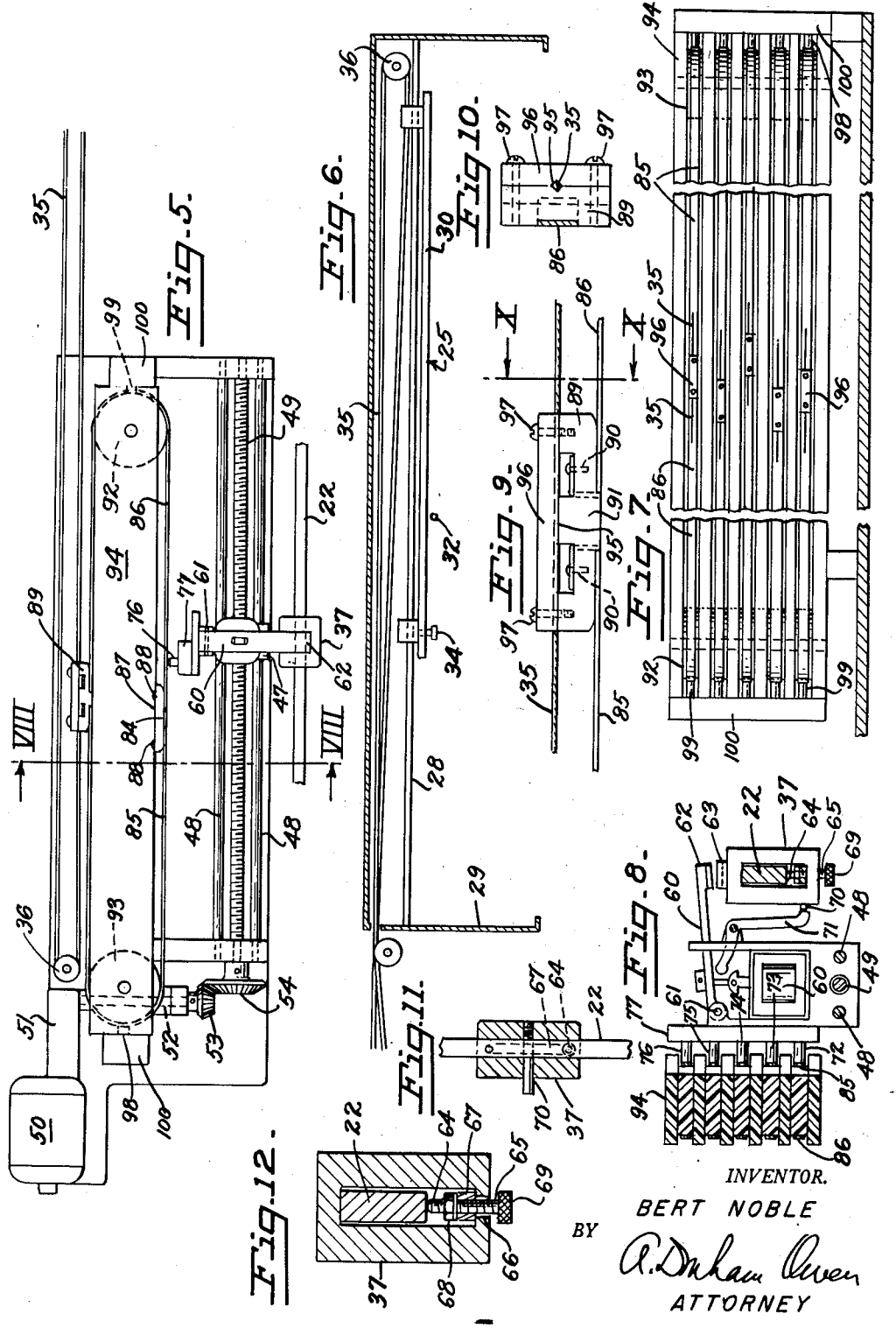

Aug. 19, 1952     B. NOBLE     2,607,579
MIX SELECTOR CONTROL
Filed June 28, 1949     5 Sheets-Sheet 5
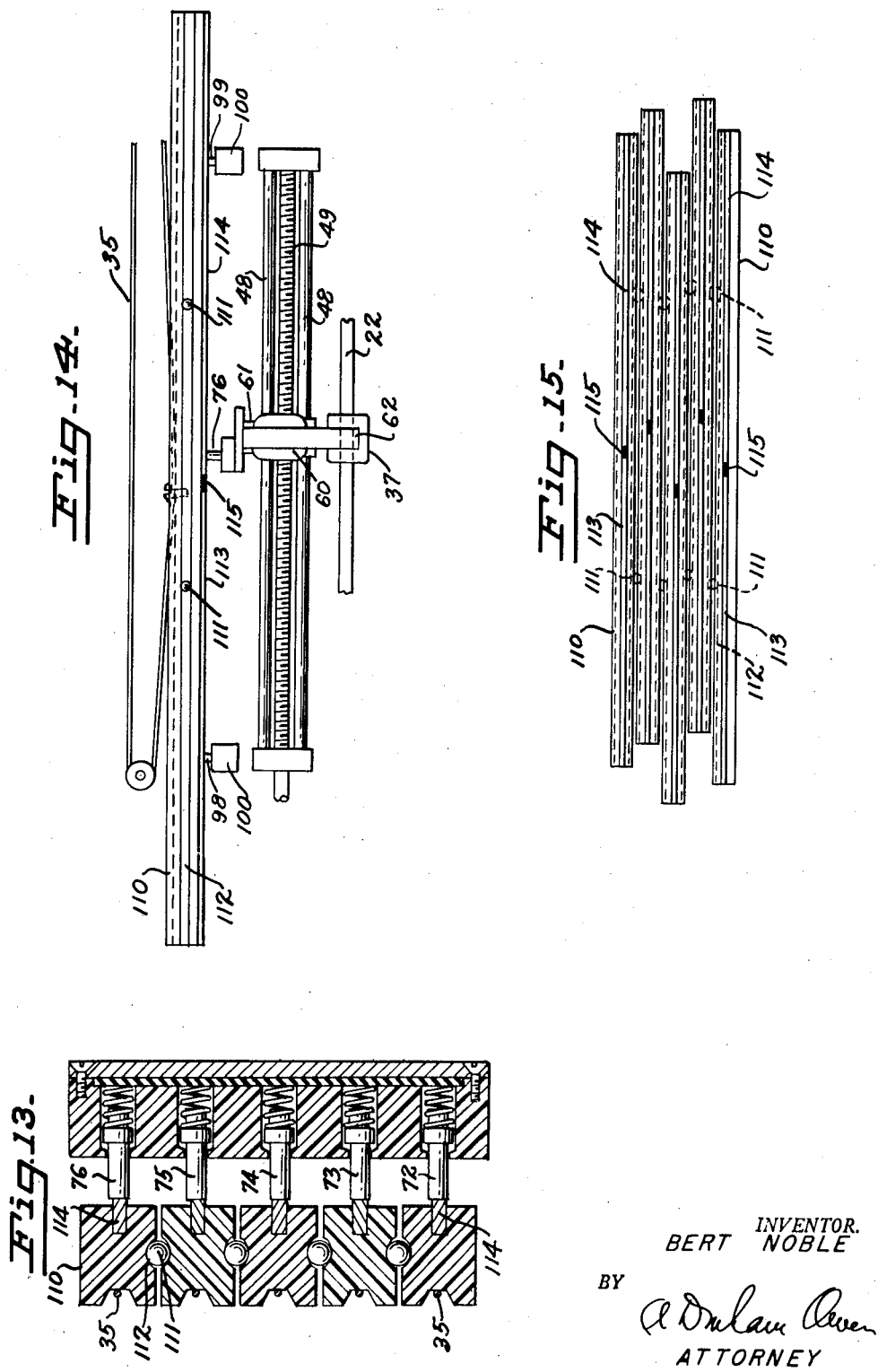
INVENTOR.
BERT NOBLE
BY
ATTORNEY Patented Aug. 19, 1952

2,607,579

UNITED STATES PATENT OFFICE 2,607,579

MIX SELECTOR CONTROL

Bert Noble, Winters, Calif.

Application June 28, 1949, Serial No. 101,817

19 Claims. (Cl. 265—56)

This invention relates to batching plants and in particular to such plants in which a plurality of elements are to be mixed together in various pre-selected combinations each of predetermined proportions of the several elements.

The object of the invention is to provide a weighing and batching mechanism by which several different weights of each aggregate can be arranged to be weighed selectively on a given batcher scale and in which the weights of each aggregate can be changed at any time without interfering with the weighing mechanism, and in which once any selected weight has been made effective on the batcher scale mechanism, there is no further connection between the selecting mechanism and the scale.

Some of the problems solved by this invention are as follows:

Modern construction projects, such as dams and other large structures of concrete, are usually carried on with several different parts of the concrete structure being poured simultaneously. Different parts, such as the power house, the spillway, the diversion tunnels, the outside face of the dam, the mass concrete, the railings, the bucket, etc., call for concrete having different characteristics. These characteristics are determined by the relative proportions of the various sizes of aggregate, and cement and water. Sometimes ice and other elements are added to the mix. This means that the modern batching plant must have a means of making instantaneous changes to a pre-selected mix without taking the operator's time from other duties or having to rely upon his noting the weights changed to. The modern batching plant must be equipped to mix in succession batches of different pre-selected composition and to do this under the control of the operator, but requiring no more of his time than is necessary to operate a switch.

One problem solved by the present machine in relation to earlier devices is in providing a mechanism so simple that only one scale beam is needed for each element of the mix, and in having the poise on that scale beam movable into any pre-selected position along the beam by a plurality of means adjacent to it.

Another problem solved by the present invention in relation to earlier devices is that here the selection of weights for the several elements of the mix can be made while the weighing of another batch is being carried on. This is because the weight selection parts of the machine are independent of the weighing scale at all times except during the short interval when the poise on the scale is being moved by the preselector mechanism for a particular mix. In other words, the mechanism for setting up the pre-selected weights to be used in the various mixes is separate from the scale in each case.

Another problem solved is in making it possible to select the various mixes from a point remote from the scale beam.

Another important problem solved is in having the weight control means effective on parts which have a large range of movement so that the tolerances can be large and thereby promote greater accuracy in measuring.

For purposes of disclosure the invention will be described as one for weighing up any one of five pre-selected mixes composed of water, cement and aggregate. This will permit the drawings and the description to be kept relatively simple while still making a full disclosure of the principles of the invention. In actual practice most mixes will contain more than water, cement and aggregate in which case the basic elements of the machine are duplicated as explained herein.

In the drawings:

Fig. 1 is essentially a diagrammatic somewhat exploded view in perspective of the water scale beam, the adjacent poise moving mechanism and the remote water setting mechanism, the mix selector switch and the circuit for moving the poise on the water scale beam. Also the location of the remote setting mechanism for the cement and for the aggregate is shown but the balance of these mechanisms is omitted for clarity of illustration.

Fig. 3 is a diagrammatic view, partly in perspective, showing the scale system for a weighing hopper (with bottom gate omitted) under a material bin;

Fig. 4 is a view in perspective of one form of poise moving mechanism;

Fig. 5 is a plan view of the device shown in Fig. 4, except that the traveler and the brush are shown in a different position relative to the trolley tape. Also the poise with a portion of the scale beam is shown;

Fig. 6 is a plan view of the remote scale setting mechanism which is at the right in Fig. 1;

Fig. 7 is a view in elevation of the back side of the poise moving mechanism with the shifting wire cut off near where it joins each tape;

Fig. 8 is a cross section view in elevation taken on the line VIII—VIII of Fig. 5;

Fig. 9 is a plan view of the connector unit for the individual trolley lines on the poise moving mechanism;

Fig. 10 is a cross section on the line X—X of Fig. 9;

Fig. 11 is a partial plan view of the scale beam with the poise shown in cross section and the poise brake shown in dotted lines;

Fig. 12 is a cross section view in elevation of the scale beam and the poise brake;

Fig. 13 is a cross section view in elevation showing a modification of the trolley mechanism;

Fig. 14 is a plan view of the modified device shown in Fig. 13; and

Fig. 15 is a view in front elevation of the modified form of trolley mechanism shown in Figs. 13 and 14.

In presenting this description and embodiment of the invention it is not intended thereby to limit the invention to this one embodiment as each manufacturer may vary each of the elements which make up the combination covered by the claims.

Broadly, the device is composed of a remote pre-selector mechanism 20 and a poise moving device 21 combined with a batching plant having an individual weighing mechanism for each element that is to go into the mix. Such a batching plant is shown in my co-pending application, Serial No. 78,879, filed February 28, 1949, which matured into Patent No. 2,527,147 on October 24, 1950. So far as possible the details in the present description will be confined to the pre-selector mechanism and to the poise moving mechanism taken in connection with the combination of the batching plant.

*The batching plant*

As shown in the foregoing application, the batching plant is composed of a plurality of batchers each having its own weigh scale on each of which is weighed out the amount of its particular element that is to go into a selected mix.

To avoid complication the batcher will be assumed to be one having three separate batching means, each with its scale beam 22 for water, 23 for cement, and 24 for the aggregate. In most installations there will be more than three batchers, but three are sufficient to illustrate the present invention.

It is important in the present invention to be able to move each poise on each scale beam 22, 23 and 24 from a remote point, in accordance with predetermined selected weights, and by means which have no connection with the scale or with the poise except during the short interval when the poise is being moved.

Figure 2:
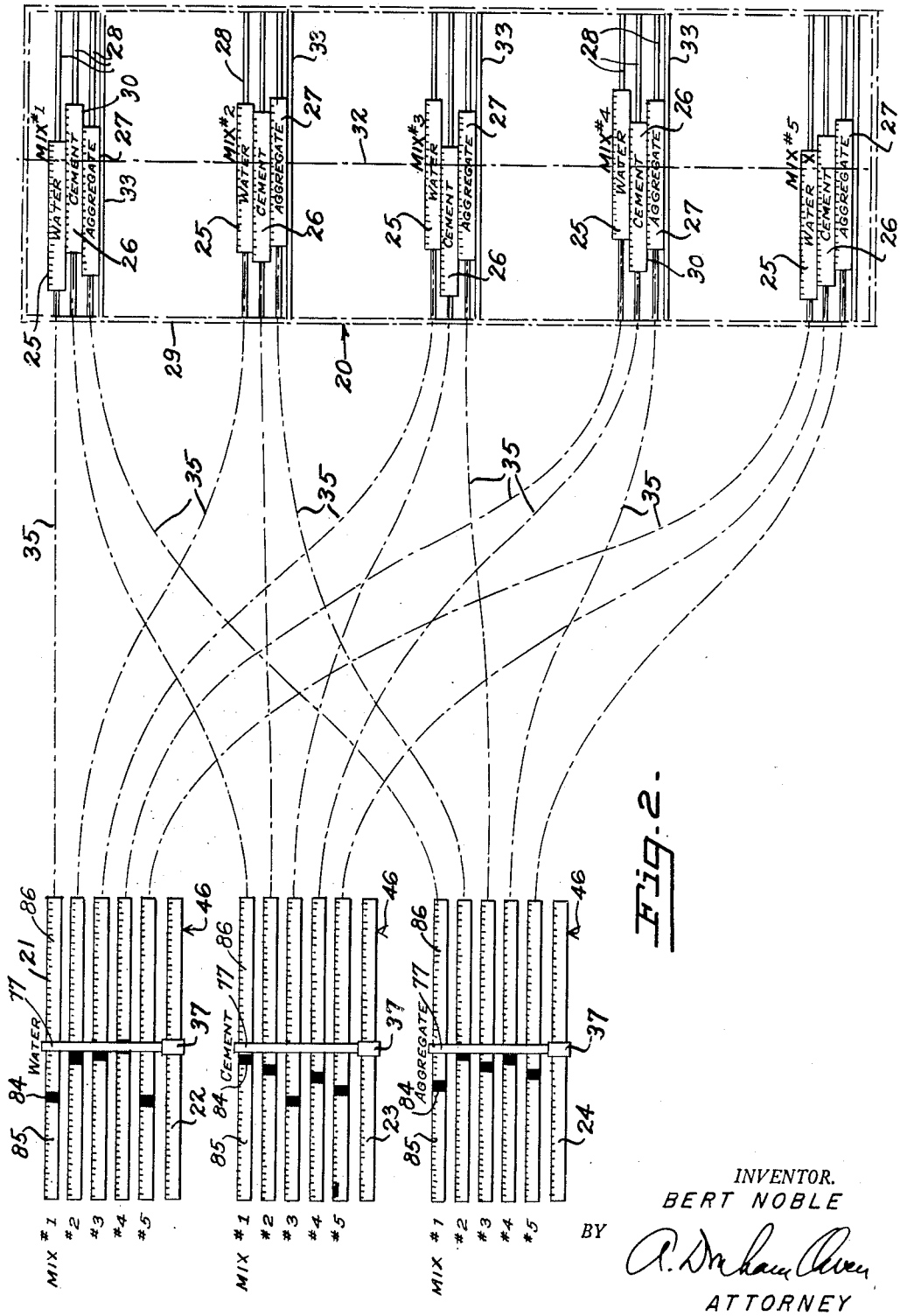
Fig. 2 is a diagrammatic view in elevation showing on the left the scale beams for water, for cement, and for the aggregate with the poise moving mechanism above each scale beam, and showing on the right the remote setting mechanism for water, cement and aggregate for each of the five batches and showing the inter-connection between the poise moving mechanism and the remote setting mechanisms.

The pre-selector mechanism 20 and the poise moving mechanism 21 are shown diagrammatically in Fig. 2.

*The pre-selector mechanism (Figs. 1, 2, and 6)*

Broadly this mechanism includes a plurality of weight-setting or measuring means 25 for one element (e. g. water); 26 for another element (e. g. cement); and 27 for another element (e. g. aggregate). These measuring means may comprise a longitudinal rule marked off to correspond with the markings on the scale beam. Each one is shown (see Fig. 6) slidably supported on a rod 28 which extends horizontally in the frame 29. The abutting longitudinal edge 30 of each measuring means 25, 26 and 27 provides the support necessary to hold each one in a generally vertical position so that the table on each one is clearly visible.

A reference line 32 is provided in front of the tables so that the operator can read each one. While the measuring means 25, 26 and 27 are shown in Figs. 1 and 2 in groups of three spaced apart, in the machine as actually built there is a spacer 33 in between each group to provide a support and to separate the pre-selector means of one mix from those of another mix.

The measuring means 25, 26 and 27 slide freely on the support rods 28 and along their abutting edges 30 when the set screw 34 is loosened (Fig. 6). This pre-selector structure, when connected to the poise moving mechanism, enables the operator to set each measuring means 25, 26 and 27 at the weight of each element desired for each of the five mixes possible on this machine. Then by operating the mix selector switch 81 to be described, the operator can be assured that the three batchers will weigh out into the mixer a mix having the desired pre-selected weight of each aggregate.

Figure 1:
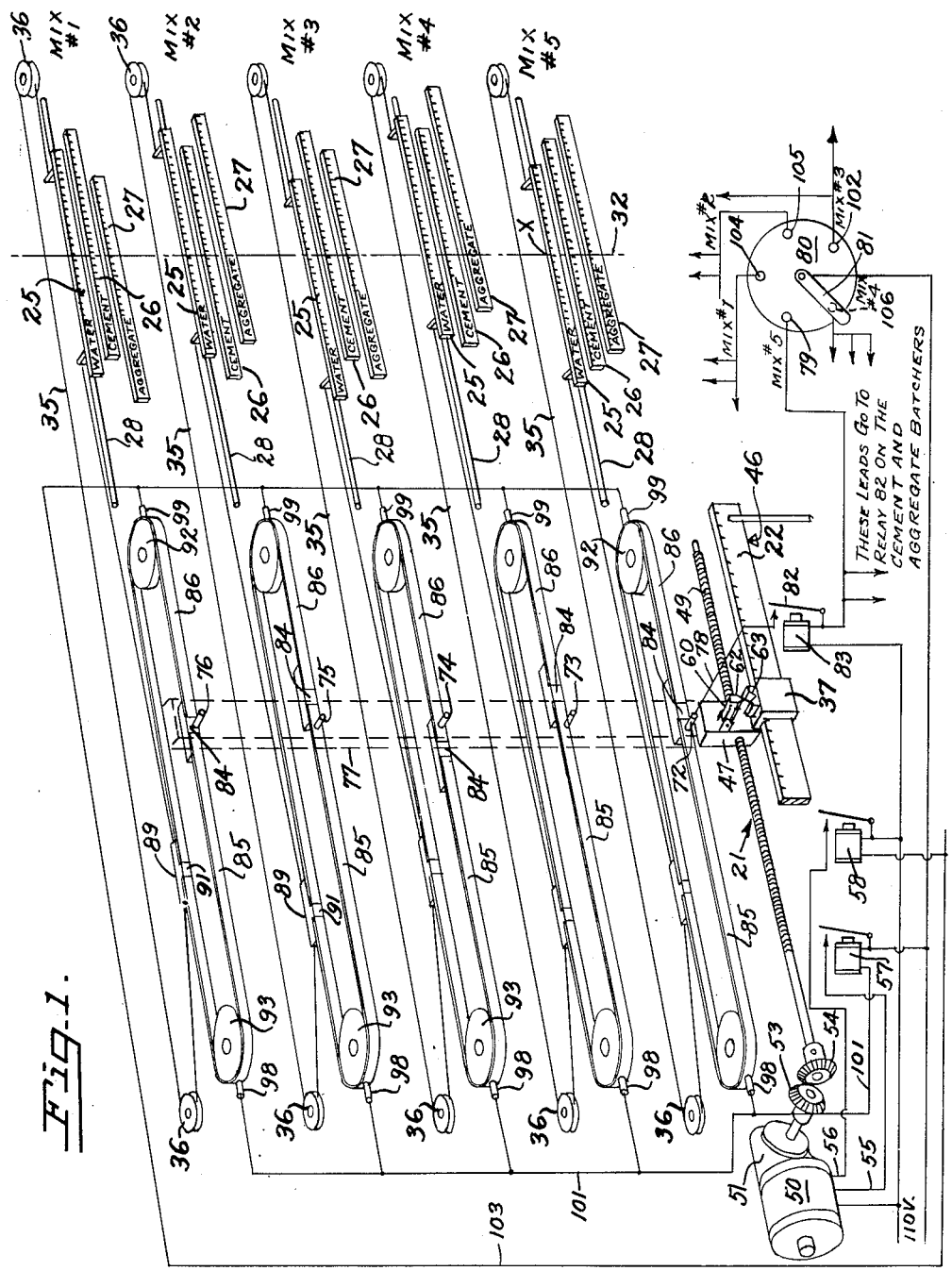

In Fig. 1 the measuring means 25, 26 and 27 are shown diagrammatically. To avoid complications in the drawings the several pre-selector means 25 for the water batching scale are the only ones connected across to their poise moving devices. Also the poise moving devices and the scales for the cement batcher and for the aggregate batcher are omitted. In Fig. 1 this connection between the measuring means 25 and the water batcher poise moving device is by means of wires 35 passing over pulleys 36. In Fig. 2 these connections are indicated only diagrammatically by the dash and dot lines 35. In this way, these mix measuring means 25, 26 and 27 may be located far away from or close to the poise moving devices. Instead of wires and pulleys, a Bowden wire, a chain and sprocket, rods, or other connecting means may be substituted.

*The scale system (Fig. 3)*

Each batcher scale has a scale beam, either 22, 23 and 24 and the one shown in Figs. 1, 5, 8, 11 and 12 is the scale beam 22 on the water scale. Each scale beam has a poise 37 movable therealong to balance the weight desired in the batcher. As shown in Fig. 3 the scale lever system for the weigh hopper 38 includes the pipe levers 39 supported on the rods 41 with the loops 40 secured to the hopper 38. The splice levers 42 are connected to the rod 43 which transmits to the scale beam 22 the load of the hopper through the lever systems 44 and 45. The scale beam 22 is fulcrumed at 46.

The poise 37 is moved along its beam 22 by a poise moving device or impeller 62.

*The poise moving device or impeller (Figs. 1, 4 to 12)*

The purpose of the poise moving device or impeller is to engage the poise 37, move it to a predetermined position along the beam 22 and then to release its hold on the poise so that there is no connection between the poise and the poise moving mechanism or impeller once the poise is in proper position.

To effect this movement of the poise, a traveler 47 is mounted on suitable horizontal supports 48 having a screw feed thread 49 arranged parallel to them. Rotation of this right hand feed thread 49 in a clockwise direction will move the traveler 47 (Fig. 4) to the left and its rotation counter-clockwise will move the traveler to the right. This rotation is effected by a motor 50 having a suitable reduction gear 51 driving a shaft 52 and connected to the feed thread 49 by bevel gears 53, 54. The motor has two windings with leads 55 and 56 to these windings. Relays 57 and 58 when energized close the circuit to one or the other of these windings.

Whenever either motor winding is energized, it energizes the solenoid motor 59 on the traveler 47 which pulls down the arm 60 pivoted at one end 61 to the traveler frame and having a V block 62 on its other end to engage in a corresponding V block 63 secured to the top of the poise 37.

Lowering of the arm 60 also effects release of the poise brake which normally holds the poise 37 in secure position on the beam 22. This brake includes a ball 64 set in the recessed end of a screw 65 supported loosely in a hole 66 in the base of the poise and suspended on the end of a leaf spring 67 where it is held to the screw by the nut 68. The brake is released by pulling downwardly on the screw head 69 or when the wedge 70 is pushed to the right in Fig. 11 when the lever 71 is moved by the arm 60 as the latter is depressed by the solenoid motor 59.

The arm 60 is held depressed and the brake ball 64 is held in released position so long as the screw 49 is rotating. This rotation carries the traveler 47 along the rods 48 and because the V blocks 62 and 63 are engaged it carries the poise along the scale beam 22.

The traveler 47 also serves as a support for a block 77 in which is resiliently mounted a series of brushes 72, 73, 74, 75 and 76. This block 77 is shown diagrammatically elongated in dotted lines in Fig. 1 and in its correct size in Figs. 4 and 8. The circuit from each brush 73, 74, 75 and 76 is not illustrated in Fig. 1, but is like the circuit for the brush 72 with the lead 78 which is normally disconnected from the contact 79 on the mix selector switch 80. It is only connected to the contact 79 when the selector element 81 is moved to the contact 79 which closes the relay 82 by means of the coil 83. Each brush 73, 74, 75 and 76 has a relay corresponding to the relay 82 so that only one brush 72, 73, 74, 75 or 76 can be brought into the circuit at one time.

*The positioners, including the trolley tapes (Figs. 1, 2, 4, 5, 7 and 8)*

The measuring means 25 for water for each of the five mixes are arranged so that each means 25 may be set to weigh into the water hopper 38 a different weight of water according to the specification for its particular mix. To effect this each measuring or weight setting means is moved positioners to the right or to the left in relation to the reference line 32 to where it registers the desired weight on its table. The end result desired is that the poise 37 will be moved by the traveler 47 to the corresponding weighing position on its scale beam 22 to correspond with the particular measuring means 25 for the particular mix selected on the mix selector switch 80. This is effected by positioners comprising the make and break mechanism now to be described for closing the circuit to one or the other windings 55 or 56 of the motor 50 to weigh up a mix according to the setting for mix #5.

As already noted, if the motor rotates the right hand thread screw 49 in a clockwise direction it will move the traveler 47 and the poise 37 to the left. If the rotation is counterclockwise the poise and traveler will move to the right. Which direction the motor and the screw 49 rotates will depend upon the position of the contact 72 in relation to the break or dead spot 84 between the trolley tapes 85 and 86 when the mix selector lever 81 is brought up to contact 79. These tapes are connected to the block of insulation 87 by the pins 88 (see Fig. 5); and to the block of insulation 89 by the pins 90 where the tapes are insulated from each other by the spacer 91 (see Fig. 9). The tape section 86 runs over a pulley 92 and the tape section 85 runs over a pulley 93. These pulleys are made of a plastic or other non-conducting material.

The position of the break or dead spot 84 along the front face of the frame 94 can be changed at will by the operator by moving the measuring or weight-setting means 25 on mix #5 on the pre-selector mechanism, because the measuring means is connected by the wire 35 to the rear block 89 of the tapes 85, 86. The wire 35 passes over the pulleys 36 and preferably passes through a notch 95 (see Fig. 10) on the back side of the block 89 where it can be clamped by the plate 96 with the screws 97. This latter arrangement facilitates adjustment of the tapes 85, 86 in relation to the measuring or weight-setting means 25 in order to calibrate these parts so that when the reference line 32 is in front of a given weight indication on the means 25 for mix #5, the dead spot 84 will be in a position to stop the traveler 47 and position the poise 37 at the same weight indication on the scale beam 22.

The tapes 85, 86 are made of a conducting material such as ribbon brass and function to conduct current to one or the other windings in the motor 50, through the brush 72 and one or the other of the end brushes 98 or 99.

The brush 98 bears on the tape section 85 and the brush 99 bears on the tape section 86. These brushes are mounted in suitable insulated blocks 100 which are part of the frame 94.

In Fig. 1, four other trolley tapes are shown above the one just described. Each is identical in structure and the function of each will become clear as this description proceeds. It would be needless repetition to go on and to give detailed specifications of these duplicate parts. It should be noted that the number of these trolley tapes adjacent each traveler 47 will correspond to the number of measuring means 25 in the machine—and the latter in turn will correspond with the number of different mixes it is desired to set up on the machine.

*The trolley tape circuits (Fig. 1)*

The circuits of which the trolley tape sections 85 and 86 are a part will now be described. In Fig. 1 the brush 72 is to the left of the dead spot 84 on the lower trolley tape and is directly on the dead spot 84 on the top trolley tape. This indicates that the last batch was made up according to mix #1.

Now assume that the operator wishes the next batch to be made up according to the pre-selected weights for mix #5. He will move the mix selector switch 81 to close the contact 79. This will energize the relay 83 and close the switch 82 to complete the circuit through the lead 78 to the brush 72 to the tape 85 to the brush 98 to the lead 101 to the relay 57 which will energize the field of the motor 50 necessary to rotate the screw 49 counterclockwise thereby to move the traveler and the poise and the brush 72 along the tape 85 until the brush 72 reaches the dead spot 84 when the circuit will be broken at 84. This will place the poise in a position on the scale beam 22 to correspond with the preselected weight of water indicated for mix #5 on the measuring means 25 where the reference means 32 crosses it at X (see Figs. 1 and 2).

Now assume that the operator wishes the next mix to be made up according to the weights given for mix #3. He will move the mix selector switch 81 to close the contact 102. This will energize a relay corresponding to the relay 83 and will close a switch 82 to connect the contact 102 with the brush 74 on the third trolley tape. The circuit will then be through the tape portion 86 to the brush 99 to the lead 103 to the relay 53 which will energize the field of the motor 50 necessary to rotate the screw 49 clockwise and thereby move the traveler and the poise and the brush 74 along the tape 86 to the left until the brush 74 reaches the dead spot 84 where the circuit will be broken at 84.

As explained before, the brushes 72, 73, 74, 75 and 76, being mounted in the carrier 77, move together along their respective trolley tapes, but the only one that is acting as a conductor is the one connected through its relay 83 and switch 82 by having the mix selector switch lever 81 in contact with its respective terminal 79, 106, 102, 105 or 104. The mix selector switch 80 shown in Fig. 1 does not have all these connections and relays shown, as they are like the one for the lower brush 72, which is shown. It will be noted that each lead from the contact terminals 79, 106, 102, 105 and 104 divides into three branches. One branch goes to the water scale mechanism 22 as illustrated connected to the terminal 79. One branch goes to the corresponding relay 83 on the cement scale mechanism and the third goes to the corresponding relay 83 on the aggregate scale mechanism. There will be as many branches as there are weighing scale mechanisms.

As shown diagrammatically at the left in Fig. 2 there will be a traveler 37 and an associated series of trolley tapes for each element in the mix. Three elements are shown to simplify this description, but in practice more than three are normal. The number of trolley tapes that are associated with each traveler will depend upon the number of different mixes that are to be kept set up. Five were used for illustration in Figs. 1, 2, 4, 7 and 8. There may be fewer or more. In Figs. 1 and 2 these trolley tapes are shown spaced apart vertically much farther than they are in practice but this was to facilitate clarity of the drawings. Also in Fig. 1 the trolley tapes and the circuitry connected to the cement measuring means 26 and those to the aggregate measuring means 27 are omitted for the same reason. These are a duplication of those shown and they are actuated by the mix selector switch 80 through the branch leads as just explained.

*The trolley bars—a modification in the positioners (Figs. 13, 14 and 15)*

In place of the trolley tapes another equivalent form of trolley structure which has worked very well comprises a plurality of trolley bars instead of the tapes. These trolley bars 110 may be made from any suitable plastic or other insulating material and they are arranged one on top of the other with antifriction rollers 111 in longitudinal channels 112 separating them. This enables each trolley bar 110 to be moved horizontally without moving the bar above or below it. Each bar 110 is connected to its corresponding measuring means 25 (see Fig. 1) by its wire 35.

On the front side of each bar 110 are the conductor members 113 and 114 having the break or dead spot 115 between them. In this form of trolley mechanism the brushes 98 and 99 and the supports 100 in Fig. 5 are moved around and face the front of the bars 110 as shown in Fig. 14. The brushes 72, 73, 74, 75 and 76 are arranged in the same manner as where the trolley tapes are used. The circuitry is the same where the trolley bars are used as where the trolley tapes are used.

*Operation*

From the foregoing, it will be seen that the invention relates to batching or proportioning of a selected group of elements, especially to those elements incorporated in concrete. It is especially adapted to large dams or commercial concrete plants where it is necessary to change instantly from one mix formula to another mix formula as on a large dam where in succession a bucket of concrete is sent to the mass or core of the dam requiring a mix low in cement content and containing large rock and the next bucket or load of concrete is to go to the power house structure where a mix having a high cement content and only small rock is required.

In the past where an accurate batch has been needed and in a device to make the changes quickly, it has been necessary to set the scales by hand. My device makes it possible to incorporate in the machine as many sets of preselector means 25 as number of mixes are to be needed and to select any one of these pre-selected mixes by turning the selector switch member 81 to the proper position to set quickly and simultaneously all of the scales or batchers to the proportion of those elements required for that particular mix.

Each construction project on which a device like the present invention will be used will have a set of specifications for each different mix that is to be used. Assuming that there are to be five different mixes, the operator will go to the preselector mechanism 20 where the measuring means 25, 26 and 27 can be adjusted so the weight indication on each is set according to the desired weight of the particular aggregate to go in each mix. As each measuring means is set at the reference line 32, it will move the trolley tape 85, 86 (or bar 110), to which it is connected by the wire 35 so that the dead spot 84 will be in a position to stop the poise 37 on its scale beam where it corresponds with the reading on its measuring means. This means it will weigh out the right amount of its element for its particular mix.

In Fig. 1 five different mixes have been set for the water, cement and aggregate on the preselector mechanism and the poise moving trolleys have moved so their dead spots 84 are in corresponding positions. The operator by moving the mix selector switch lever 81 to any of the five contacts 104, 105, 102, 106 or 79 can select what mix will be weighed out by the water batcher, by the cement batcher, and by the aggregate batcher. The instant one batching operation is completed and the materials are dumped from the batchers into the mixer, the operator can leave the mix selector on the same mix or he can choose any of the other four.

It should be noted that there is only a single scale beam for each aggregate batcher and that once the poise 37 is moved into position there is no connection between the weight selecting mechanism and the poise or any other part of the scale.

While the invention has been shown as including a plurality of aggregates being measured simultaneously, it can also be used where a remote control is desired in measuring out different pre-selected weights on a single scale. In this case the mechanism would be substantially that shown in Fig. 1. One example of such a single scale control would be in connection with the master scale shown in my co-pending application, Serial No. 78,879, now Patent No. 2,527,147.

I claim:

1. In a measuring plant for measuring selectively on a single scale different pre-selected weights, the combination of a scale, having a scale beam, and a poise movable along said beam; a plurality of weight-setting means remote from said beam each of which can be set independently of the other, and an electrical circuit make and break device connected to each of said weight-setting means and operable thereby; a traveler for moving said poise along said beam; electrical means for moving said traveler in either direction; and a circuit for energizing said electrical means, said circuit including a selector switch for establishing contact between said electrical means and any one of said circuit devices whereby said electrical means is energized until said poise is moved into a position corresponding to the weight set by said weight-setting means, said circuit device then breaking said circuit.

2. The device of claim 1 in which there are a plurality of scales each with the above mechanism each scale beam having the same number of weight-setting means, and said weight-setting means and their corresponding circuit devices being arranged in sets, each set having one weight-setting means and one circuit device for each scale, and in which there is a single selector switch for establishing contact as aforesaid between each of said electrical means and its corresponding circuit device in any one set.

3. In a measuring plant for measuring selectively on a single scale different predetermined weights, the combination of a weight supporting means; a scale beam; linkage connecting said means to said beam; a poise movable along said beam; a power actuated impeller to engage and move said poise; a plurality of variable positioners adjacent said impeller adapted to be activated selectively to start and to stop said impeller; and means for adjusting each of said positioners to any predetermined stop position.

4. The device of claim 3 in which the means for adjusting said positioners is remote from said scale beam and includes a measuring scale indicator connected to each positioner.

5. The device of claim 3 in which there is control means to place said power actuated impeller under the control of any of said variable positioners.

6. In a measuring plant for weighing automatically into a plurality of separate weigh hoppers a plurality of different materials in different proportions as desired, the combination of a plurality of separate weigh hoppers; a scale beam for each weigh hopper; linkage connecting each hopper to its associated scale beam; a poise movable along said beam; and a poise moving mechanism for the poise on each scale beam, said mechanism in each case including a power driven unit, having a poise engaging means for engaging and moving said poise whenever said unit is moving, a control unit moved by said poise engaging means, a plurality of control means adapted to be engaged by said control unit, means for individually adjusting each of said control means, and means for selecting one of said control means to control said control unit and for moving said power driven unit.

7. The device of claim 6 in which the plurality of control means each has a weight measuring indicator connected to it for pre-selecting the weight to be weighed into its hopper when it is selected as the control means.

8. The device of claim 6 in which said power-driven unit includes an electric motor and said control unit includes a plurality of contactors each one engaging one of said adjustable control means, and in which said control means include electrical conductors with a dead spot engageable where said poise moving mechanism is to come to rest.

9. The device of claim 8 in which said electrical conductors are tapes.

10. The device of claim 8 in which said electrical conductors are slidably mounted bars.

11. In a batching plant, the combination of a plurality of weigh hoppers; a scale system supporting each hopper; a scale beam for each scale system; a poise on each scale beam; a poise moving mechanism adjacent each scale beam, each mechanism including an electrically driven unit having a poise engaging means for momentarily engaging said poise to move it, magnetic means for effecting said momentary engagement, a trolley mechanism adjacent said unit having a plurality of pairs of conductor strips with each pair separated electrically by a dead spot, a brush supporting housing movable with said unit and having brushes engageable one with each of said pairs of conductor strips, means for conducting current to each separate conductor composing said plurality of pairs of conductors; and switch means connected to the driving unit on each scale system for selecting which pair of said conductors will be connected into the electrical circuit, said circuit including a reversible motor to drive said unit and electrical relay means for energizing one winding or the other of said motor and keeping it energized until said motor moves the driven unit sufficiently to carry the poise and the brush supporting housing and the brushes in it to where said brushes are in alignment with the dead spot between the pair of conductors connected into the electrical circuit by said switch means.

12. The device of claim 11 in which there is means for moving each pair of conductor strips in respect to the other pairs of conducting strips to bring its dead spot in a different relative position to the dead spot between each other pair of conductors.

13. The device of claim 12 in which a remote measuring and moving means is connected to each pair of conductor strips and comprises said means for moving said conductor strips, said remote means including an indicator for indicating the weight corresponding to its position.

14. In a batching plant, the combination of a weigh hopper; a scale system supporting said hopper; a scale beam for said scale system; a poise on said scale beam; a poise moving mechanism adjacent said scale beam, said mechanism including an electrically driven unit having a poise engaging means for momentarily engaging said poise to move it, magnetic means for effecting said momentary engagement, a trolley mechanism adjacent said unit having a plurality of pairs of conductor strips with each pair separated electrically by a dead spot, a brush-supporting housing movable with said unit and having brushes engageable one with each of said pairs of conductor strips, means for conducting current to each separate conductor composing said plurality of pairs of conductors; and switch means connected to the driving unit on said scale system for selecting which pair of said conductors will be connected into the electrical circuit, said circuit including a reversible motor to drive said unit and electrical relay means for energizing one winding or the other of said motor and keeping it energized until said motor moves the driven unit sufficiently to carry the poise and the brush-supporting housing and the brushes in it to where said brushes are in alignment with the dead spot between the pair of conductors connected into the electrical circuit by said switch means.

15. In a measuring plant for measuring selectively on a single scale different pre-selected weights, the combination of a scale having a scale beam and a poise movable along said beam; a plurality of weight-setting means remote from said beam, each of which can be set independently of the other; means controllable by any of said weight-setting means for moving said poise along said beam; a control device for selecting which of said weight-setting means shall control said poise-moving means; and means for automatically rendering inoperative said poise-moving means and disconnecting it from said poise when said poise-moving means has moved said poise to the position corresponding to the one set on said weight-setting means.

16. In a measuring plant for measuring selectively on a single scale different predetermined weights, the combination of a weight-supporting means; a scale beam; linkage connecting said means to said beam; a poise movable along said beam; impelling means for moving said poise; a plurality of weight-setting means not connected to said beam; means controlled by one of said weight-setting means at a time for actuating and shutting off said impelling means so that said scale is set for the weight indicated on the then-controlling weight-setting means; and selector means for placing any one of said weight-setting means into operation.

17. A mix selecting device for use with an aggregate batching plant having a weighing means with a scale beam for measuring out quantities of aggregate, having in combination with the scale beam of said weighing means: a poise movable along said beam; means for moving said poise in either direction along said beam, said poise-moving means having connection with said poise only during the time it is moving said poise; a plurality of individually adjustable value-indicating, remote, pre-setting means not connected to said poise or said scale beam; a corresponding plurality of individual control means, each connected to and operated by its corresponding said pre-setting means for actuating and inactivating said poise-moving means; and means for selectively placing in operation one of said control means.

18. In a measuring plant for measuring selectively on a single scale different pre-selected weights, the combination of a scale having a scale beam and a poise movable along said beam; a plurality of pre-selector means remote from said beam, each of which can be set independently of the other; means controllable by any of said pre-selector means for moving said poise along said beam to the pre-selected position and then ceasing to affect said poise; and a control device for selecting which of said pre-selector means shall control said poise-moving means.

19. In a measuring plant for measuring selectively on a single scale different predetermined weights, the combination of a weight-supporting means; a scale beam; linkage connecting said means to said beam; a poise movable along said beam; impelling means for operatively engaging said poise and moving it; a plurality of pre-selector means, unconnected with said poise and said beam; means controlled by said pre-selector means for first actuating said impelling means to move said poise to the weight indicated on said pre-selector means; means also controlled by said pre-selector means for then disconnecting said impelling means from said poise; and means for selecting which one of said pre-selector means shall control said actuating and disconnecting means.

BERT NOBLE.

REFERENCES CITED

The following references are of record in the file of this patent:

UNITED STATES PATENTS

| Number | Name | Date |
|---|---|---|
| 785,209 | Hamilton | Mar. 21, 1905 |
| 1,241,672 | Smith | Oct. 2, 1917 |
| 1,254,668 | Foster | Jan. 29, 1918 |
| 2,044,017 | Robb | June 16, 1936 |